US008406351B1

(12) United States Patent
Altekar

(10) Patent No.: US 8,406,351 B1
(45) Date of Patent: *Mar. 26, 2013

(54) METHOD AND DEVICE TO COMPENSATE FOR BASELINE WANDER

(75) Inventor: Shirish Altekar, Palo Alto, CA (US)

(73) Assignee: Marvell International, Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/418,013

(22) Filed: Mar. 12, 2012

Related U.S. Application Data

(63) Continuation of application No. 11/274,854, filed on Nov. 16, 2005, now Pat. No. 8,139,628.

(60) Provisional application No. 60/642,625, filed on Jan. 10, 2005.

(51) Int. Cl.
*H04L 27/06* (2006.01)

(52) U.S. Cl. ........ 375/341; 375/229; 375/232; 375/233; 375/350

(58) Field of Classification Search .......... 375/229–236, 375/346–350, 341
See application file for complete search history.

(56) References Cited

U.S. PATENT DOCUMENTS

| | | | |
|---|---|---|---|
| 4,486,740 A | 12/1984 | Seidel | |
| 4,675,650 A | 6/1987 | Coppersmith et al. | |
| 4,888,779 A | 12/1989 | Karabed et al. | |
| 5,095,496 A | 3/1992 | Jang | |
| 5,144,304 A | 9/1992 | McMahon et al. | |
| 5,293,402 A | 3/1994 | Crespo et al. | |
| 5,375,249 A | 12/1994 | Cho | |
| 5,396,239 A | 3/1995 | McMahon et al. | |
| 5,442,492 A | 8/1995 | Cunningham et al. | |
| 5,537,424 A | 7/1996 | Karabed et al. | |
| 5,608,397 A | 3/1997 | Soljanin | |
| 5,635,933 A | 6/1997 | Fitzpatrick et al. | |
| 5,757,822 A | 5/1998 | Fisher et al. | |
| 5,821,795 A | 10/1998 | Yasuda et al. | |
| 5,910,969 A | 6/1999 | Sayiner et al. | |
| 6,018,304 A | 1/2000 | Bessios | |
| 6,046,691 A | 4/2000 | Aziz et al. | |
| 6,097,320 A | 8/2000 | Kuki et al. | |
| 6,184,806 B1 | 2/2001 | Patapoutian et al. | |
| 6,198,413 B1 | 3/2001 | Widmer | |
| 6,204,781 B1 | 3/2001 | Aziz et al. | |
| 6,204,980 B1 | 3/2001 | Momtaz et al. | |
| 6,219,088 B1 | 4/2001 | Liu et al. | |
| 6,301,298 B1 | 10/2001 | Kuntz et al. | |
| 6,332,205 B1 | 12/2001 | Conway | |
| 6,366,223 B1 | 4/2002 | Lee et al. | |
| 6,396,254 B1 | 5/2002 | Feyh et al. | |
| 6,446,236 B1 | 9/2002 | McEwen et al. | |
| 6,581,181 B1 | 6/2003 | Sonu | |

(Continued)

FOREIGN PATENT DOCUMENTS

EP 01058432 A2 12/2000

OTHER PUBLICATIONS

Yeh, "Equivalence of Signal Processing in Perpendicular and Longitudinal Recordings", Digests of PMRC 2000, The Fifth Perpendicular Magnetic Recording Conference, (Sandai, Japan) Oct. 23-26, 2000, p. 231.

*Primary Examiner* — Curtis Odom

(57) ABSTRACT

A method and device for compensating for undesirable signal characteristics such as baseline wander that includes a linear equalization filter responsive to receive an input, a combiner responsive to an output of the linear equalization filter, and a decision feedback equalization filter responsive to an output of the combiner, where the combiner is further responsive to an output of the decision feedback equalizer. Additionally, an error feedback circuit is responsive to the output of the combiner, and the combiner is further responsive to an output of the error feedback circuit to form a compensated signal having reduced distortion relative to the distorted signal.

19 Claims, 16 Drawing Sheets

U.S. PATENT DOCUMENTS

| | | |
|---|---|---|
| 6,661,356 B1 | 12/2003 | Oberg |
| 6,856,790 B1 | 2/2005 | He |
| 6,917,314 B1 | 7/2005 | Oberg |
| 7,107,514 B1 | 9/2006 | Oberg et al. |
| 7,116,504 B1 | 10/2006 | Oberg |
| 7,167,327 B2 | 1/2007 | Feyh |
| 7,257,181 B2 | 8/2007 | Jones et al. |
| 7,480,347 B2 | 1/2009 | Black et al. |
| 7,606,547 B1 | 10/2009 | Roo et al. |
| 8,139,628 B1 * | 3/2012 | Altekar .................. 375/229 |
| 2002/0172275 A1 | 11/2002 | Birru |
| 2003/0138038 A1 | 7/2003 | Greiss et al. |
| 2004/0005001 A1 | 1/2004 | Jones et al. |
| 2005/0094723 A1 | 5/2005 | Takatori |
| 2005/0123034 A1 | 6/2005 | Lee et al. |

\* cited by examiner

METHOD AND DEVICE TO COMPENSATE FOR BASELINE WANDER

CROSS-REFERENCE TO RELATED APPLICATIONS

This application claims priority under 35 U.S.C. §119(e) to provisional U.S. Patent Application No. 60/642,625, filed on Jan. 10, 2005, the disclosure of which is expressly incorporated by reference herein in its entirety.

BACKGROUND OF THE INVENTION

1. Field of the Invention

The invention is directed generally to compensating for undesirable characteristics in electronic signals, and, more particularly, to a method and device to compensate for baseline wander.

2. Related Art

In the past, baseline wander has not been a critical factor in the design of compensation systems. However, with the advancement of technology and more sensitive applications, baseline wander has become problematic. In particular, in many devices there is an idealized perpendicular channel response that has a strong DC component. In particular, there is a sharp notch at DC due to constraints imposed by real-world physics. Additionally, in such devices, for example, a readback signal may be coupled to a pre-amplifier or a channel through a high pass filter (HPF) to facilitate analog circuit design. However, this configuration leads to an undesirable long narrow tail in the pulse response. This tail takes substantially the form of an exponential decay. If the data pattern has significant build up of this DC component, a baseline shift can result. This baseline shift of the pulse response needs to be zero or near zero or errors in the system may be caused.

There have been three different approaches that have been taken for baseline wander compensation. These methods include: (1) error feedback loop (also known as DC-loop or adaptive loop); (2) linear equalization (also known as feedforward equalization); and (3) decision feedback equalization (a form of the predictive loop is equivalent). In each of these separate approaches, the baseline wander compensation has been less than satisfactory. For example, detector delay plays an important role and thus has created significant problems in approaches (1) and (3).

With respect to method (1), in one particular exemplary application of an error feedback loop, the worst-case baseline wander signal has a frequency of 0.001 $f_{tbg}$ (sample frequency with a 1000 bit period), which requires at least 20 dB attenuation for good performance. Accordingly, the gain $g_{blw}$ has to be at least 0.01 $f_{tbg}$ and the loop is stable as long as the Viterbi delay is 25 T or less. Unfortunately as the system performance approaches the critical delay, the loop exhibits huge overshoot, and performance suffers.

In an example of method (2), a linear equalization device uses the inverse of the HPF transfer function H(z) that results in:

$$\frac{1-(1-\Delta)z^{-1}}{1-z^{-1}}$$

where $$\Delta = \frac{2\pi\alpha}{1+\pi\alpha}$$

and α is the fractional corner frequency. However, this system is not stable. The DC input gives unbounded output. Attempts to try moving a pole slightly inside the unit circle results in $$\frac{1-(1-\Delta)z^{-1}}{1-(1-\varepsilon)z^{-1}}.$$

This results in a huge boost at DC with $\Delta/\varepsilon$ which will have a negative performance impact. Accordingly, a linear equalization device with a pole close to the unit circle requires a large amount of precision. In this regard, the results obtained when using a linear equalization device have been unsatisfactory.

The use of method (3), a decision feedback equalization filter, to model the tail of the response after the Viterbi delay also does not have satisfactory results. In this regard, this filter does not work well with the high HPF cutoffs as the portion of the tail not cancelled is large. Accordingly, the decision feedback equalization filter has not been a viable solution.

SUMMARY OF THE INVENTION

The invention allows for superior baseline compensation using a unique compensation approach, which results in a significant reduction in baseline wander and other advantages apparent from the discussion herein.

In particular, as described herein, the invention combines aspects of the three known signal compensation approaches, which have been unsatisfactory when used individually, and integrates them in a novel system that has unique properties providing for the compensation of undesirable characteristics in signals, such as baseline wander. In particular, the combination of a linear Baseline Wander (BLW) equalizer, error feedback loop and a decision feedback equalization filter described herein provides for optimal compensation. Moreover, the decision feedback equalization can be a double pole system to provide higher order signal processing. Applicant is not aware of any attempts to combine the individual compensation approaches discussed herein, which may be due, at least, in part to the complexity involved in combining these prior compensation approaches together. Moreover, Applicant is not aware of any attempts to compensate baseline wander in a double pole system.

The invention may be implemented in a number of ways. According to one aspect of the invention a compensation circuit includes a linear equalization filter responsive to receive an input, a combiner responsive to an output of the linear equalization filter, a decision feedback equalization filter responsive to an output of the combiner, the combiner is further responsive to an output of the decision feedback equalizer, and an error feedback circuit responsive to the output of the combiner, the combiner is further responsive to an output of the error feedback circuit. An output of the compensation circuit may have reduced baseline wander. An output of the compensation circuit may have substantially no tail from approximately time 0 to approximately time $D_{fb}$, where $D_{fb}$ is a delay of the decision feedback equalization filter. The circuit may include a sequence detector responsive to the combiner. The decision feedback equalizer may be responsive to an output of the sequence detector. The error feedback circuit may have a first input responsive to an output of the sequence detector and a second input responsive to the output of the combiner. The error feedback circuit may include a reconstruction filter responsive to the first input and a delay circuit responsive to the second input. The error feedback circuit may include a second combiner responsive to an output of the reconstruction filter and an output of the delay circuit. The decision feedback equalization filter may be responsive to the output of the reconstruction filter. The sequence detector may be a Viterbi detector. The decision feedback equalization filter further may include an integrator responsive to the sequence detector. The decision feedback equalization filter further may include a second pole module to provide higher order signal processing. The error feedback circuit further may include an integrator and a scaler responsive to the output of the second combiner. The circuit may include an input circuit comprising a high pass filter. The circuit may include an analog front-end component responsive to the high pass filter. The circuit may include a finite impulse response filter responsive to the linear equalization filter. The circuit may include a finite impulse response filter. The linear equalization filter may be responsive to the finite impulse response filter. The finite impulse response filter further may include a delay line having a plurality of storage devices, and a delay line selector configured to select at least one of the plurality of storage devices. The circuit may include an analog cancellation module that includes a gain responsive to the decision feedback equalization filter and the combiner may be responsive to the gain. The circuit may include an finite impulse response filter and the signal compensator may operate at least in part in accordance with one of the following transfer functions:

$$H(z)F(z)=g(1-\Delta[z^{-L}+(1-\Delta)z^{-L-1}+(1-\Delta)^2z^{-L-2}+\ldots])$$

where $$g = \frac{1}{1+\pi\alpha}, \Delta = \frac{2\pi\alpha}{1+\pi\alpha}, a$$

is the fractional corner frequency, and L is the delay, and $$H(z)F(z) = g_1 g_2 \left(1 - z^{-L} \frac{\Delta_1 + \Delta_2 - (\Delta_1 + \Delta_2 - 2\Delta_1\Delta_2)z^{-1} - \Delta_1\Delta_2 z^{-L}}{(1-(1-\Delta_1)z^{-1})(1-(1-\Delta_2)z^{-1})}\right)$$

where $$g_j = \frac{1}{1+\pi\alpha_j}, \Delta_j = \frac{2\pi\alpha_j}{1+\pi\alpha_j},$$

L is the length of the finite impulse response filter, $\alpha_1$ is a read-channel fractional pole location, and $\alpha_2$ is a preamp fractional pole location.

According to another aspect of the invention a method of compensating for errors in a signal includes the steps of (a) receiving an input signal, (b) linearly equalizing the input signal from step (a), (c) combining an output from step (b) to form a compensated signal, (d) forming a decision equalized feedback signal in response to an output from step (c), and (e) forming an error feedback signal in response to the output from step (c), where step (c) further includes the step of combining the output of step (d) and an output of step (e). The compensated signal may have reduced baseline wander. The compensated signal may have substantially no tail from approximately time 0 to approximately time $D_{fb}$, where time $D_{fb}$ may be a delay of the step of filtering, at least in part, the output from step (b). The method may include the step of detecting a sequence of the compensated signal. The step of detecting a sequence may include detecting the sequence with a Viterbi algorithm. The step of forming a decision equalized feedback further may include second pole processing to provide higher order signal processing. The step of forming an error feedback signal further may include delaying the compensated signal to form a delayed signal and reconstruction filtering the compensated signal to form a reconstruction filtered signal. The step of forming an error feedback further may include combining the delayed signal and the reconstruction filtered signal. The step of reconstruction filtering may be responsive to the step of detecting the compensated signal with a Viterbi algorithm. The step of filtering the linearly equalized output to form a decision equalized feedback may be responsive to the step of detecting the compensated signal with a Viterbi algorithm. The step of filtering the output to form a decision equalized feedback may be responsive to the step of reconstruction filtering. The method may include a step of finite impulse response processing to form a signal that may be finite impulse responsive to prior to the step of linearly equalizing. The step of finite impulse response processing further may include delaying and storing an input, and selecting the delayed and stored input. The method may include the step of analog cancellation processing that includes adding gain responsive to the step of forming a decision equalized feedback. The method may include the steps of filtering the signal to remove low frequency components and converting the signal from analog to digital. The compensating method may operate at least in part in accordance with at least one of the following transfer functions:

$$H(z)F(z)=g(1-\Delta[z^{-L}+(1-\Delta)z^{-L-1}+(1-\Delta)^2z^{-L-2}+\ldots])$$

where $$g = \frac{1}{1+\pi\alpha}, \Delta = \frac{2\pi\alpha}{1+\pi\alpha},$$

$\alpha$ is the fraction corner frequency, and L is the length of a finite impulse response filter, and $$H(z)F(z) = g_1 g_2 \left(1 - z^{-L} \frac{\Delta_1 + \Delta_2 - (\Delta_1 + \Delta_2 - 2\Delta_1\Delta_2)z^{-1} - \Delta_1\Delta_2 z^{-L}}{(1-(1-\Delta_1)z^{-1})(1-(1-\Delta_2)z^{-1})}\right)$$

where $$g_j = \frac{1}{1+\pi\alpha_j}, q_j = \frac{2\pi\alpha_j}{1+\pi\alpha_j},$$

L is the length of a finite impulse response filter, $\alpha_1$ is a read-channel fractional pole location, and $\alpha_2$ is a preamp fractional pole location. A computer readable medium having computer executable code may execute digital signal processing in accordance with the method noted above.

In yet another aspect of the invention a signal compensator includes means for receiving a signal and outputting a signal with distortion, means, responsive to the distorted signal, producing an output linearly equalized relative to the distorted signal, means, responsive at least in part to the linearly equalized output, forming a decision equalized feedback, means, responsive at least in part to the linearly equalized output, generating an error feedback, and means, responsive to the producing means, forming means, and generating means, forming a compensated signal having reduced distortion relative to the distorted signal. An output of the compensation circuit may have reduced baseline wander. An output of the compensation circuit may have substantially no tail from approximately time 0 to approximately time $D_{fb}$, where $D_{fb}$ is a delay of the decision equalized feedback means. The circuit may include a means for detecting a sequence responsive to the compensated signal forming means. The decision equalized feedback means may be responsive to an output of the sequence detecting means. The error feedback generating means may have a first input responsive to an output of the sequence detecting means and a second input responsive to the output of the compensated signal forming means. The error feedback generating means may include means for reconstruction filtering responsive to the first input and a means for delaying responsive to the second input. The error feedback generating means may include a combiner means responsive to an output of the reconstruction filtering means and an output of the means for delaying. The decision equalized feedback means may be responsive to the output of the reconstruction filtering means. The sequence detecting means may be a Viterbi detector. The decision equalized feedback means further may include means for integrating responsive to the sequence detecting means. The decision equalized feedback means further may include a second pole module to provide higher order signal processing. The error feedback generating means further may include means for integrating and a means for scaling responsive to the output of the means for combining. The circuit may include means for inputting comprising a high pass filter. The circuit may include an analog front-end component responsive to the high pass filter. The circuit may include means for finite impulse response filtering responsive to the linear equalization filtering means. The circuit may include means for finite impulse response filtering, the linear equalization filtering means may be responsive to the means for finite impulse response filtering. The finite impulse response filtering means further may include a delay line having a plurality of storage devices, and a delay line selector configured to select at least one of the plurality of storage devices. The circuit may include means for analog cancellation that includes a gain responsive to the decision equalized feedback means and the compensated signal forming means may be responsive to the gain. The circuit may include means for finite impulse response filtering and the signal compensator operates at least in part in accordance with one of the following transfer functions:

$$H(z)F(z)=g(1-\Delta[z^{-L}+(1-\Delta)z^{-L-1}+(1-\Delta)^2z^{-L-2}+\ldots])$$

where $$g = \frac{1}{1+\pi\alpha}, \Delta = \frac{2\pi\alpha}{1+\pi\alpha},$$

$\alpha$ is the fractional corner frequency, and L is the delay, and $$H(z)F(z) = g_1g_2\left(1 - z^{-L}\frac{\Delta_1 + \Delta_2 - (\Delta_1 + \Delta_2 - 2\Delta_1\Delta_2)z^{-1} - \Delta_1\Delta_2z^{-L}}{(1-(1-\Delta_1)z^{-1})(1-(1-\Delta_2)z^{-1})}\right)$$

where $$g_j = \frac{1}{1+\pi\alpha_j}, \Delta_j = \frac{2\pi\alpha_j}{1+\pi\alpha_j},$$

L is the length of the means for finite impulse response filtering, $\alpha_1$ is a read-channel fractional pole location, and $\alpha_2$ is a preamp fractional pole location.

In yet another aspect of the invention a compensation circuit includes a linear equalization filter responsive to receive an input and introduces baseline wander, a combiner responsive to an output of the linear equalization filter, and a decision feedback equalization filter responsive an output of the combiner, the combiner is further responsive to an output of the decision feedback equalizer to compensate for the baseline wander. An output of the compensation circuit may have reduced baseline wander. An output of the compensation circuit may have substantially no tail from approximately time 0 to approximately time $D_{fb}$, where $D_{fb}$ is a delay of the decision feedback equalization filter. The circuit may include a sequence detector responsive to the combiner. The decision feedback equalizer may be responsive to an output of the sequence detector. The circuit may include an error feedback circuit responsive the output of the combiner, the combiner is further responsive to an output of the error feedback circuit, and the error feedback circuit may have a first input responsive to an output of the sequence detector and a second input responsive to the output of the combiner. The error feedback circuit may include a reconstruction filter responsive to the first input and a delay circuit responsive to the second input. The error feedback circuit may include a second combiner responsive to an output of the reconstruction filter and an output of the delay circuit. The decision feedback equalization filter may be responsive to the output of the reconstruction filter. The sequence detector may be a Viterbi detector. The decision feedback equalization filter further may include an integrator responsive to the sequence detector. The decision feedback equalization filter further may include a second pole module to provide higher order signal processing. The circuit may include an error feedback circuit responsive the output of the combiner, the combiner is further responsive to an output of the error feedback circuit, and the error feedback module further may include an integrator and a scaler responsive to the output of the second combiner. The circuit may include an input circuit comprising a high pass filter. The circuit may include an analog front-end component responsive to the high pass filter. The circuit may include a finite impulse response filter responsive to the linear equalization filter. The circuit may include a finite impulse response filter. The linear equalization filter may be responsive to the finite impulse response filter. The finite impulse response filter further may include a delay line having a plurality of storage devices, and a delay line selector configured to select at least one of the plurality of storage devices. The circuit may include an analog cancellation module that includes a gain responsive to the decision feedback equalization filter and the combiner may be responsive to the gain. The circuit may include an FIR filter and the signal compensator may operate at least in part in accordance with one of the following transfer functions:

$$H(z)F(z)=g(1-\Delta[z^{-L}+(1-\Delta)z^{-L-1}+(1-\Delta)^2z^{-L-2}+\ldots])$$

where $$g = \frac{1}{1+\pi\alpha}, \Delta = \frac{2\pi\alpha}{1+\pi\alpha},$$

α is the fractional corner frequency, and L is the delay, and $$H(z)F(z) = g_1 g_2 \left(1 - z^{-L} \frac{\Delta_1 + \Delta_2 - (\Delta_1 + \Delta_2 - 2\Delta_1\Delta_2)z^{-1} - \Delta_1\Delta_2 z^{-L}}{(1-(1-\Delta_1)z^{-1})(1-(1-\Delta_2)z^{-1})}\right)$$

where $$g_j = \frac{1}{1+\pi\alpha_j}, \Delta_j = \frac{2\pi\alpha_j}{1+\pi\alpha_j},$$

L is the length of the FIR filter, $\alpha_1$ is a read-channel fractional pole location, and $\alpha_2$ is a preamp fractional pole location.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings.

DETAILED DESCRIPTION OF THE INVENTION

Figure 1:
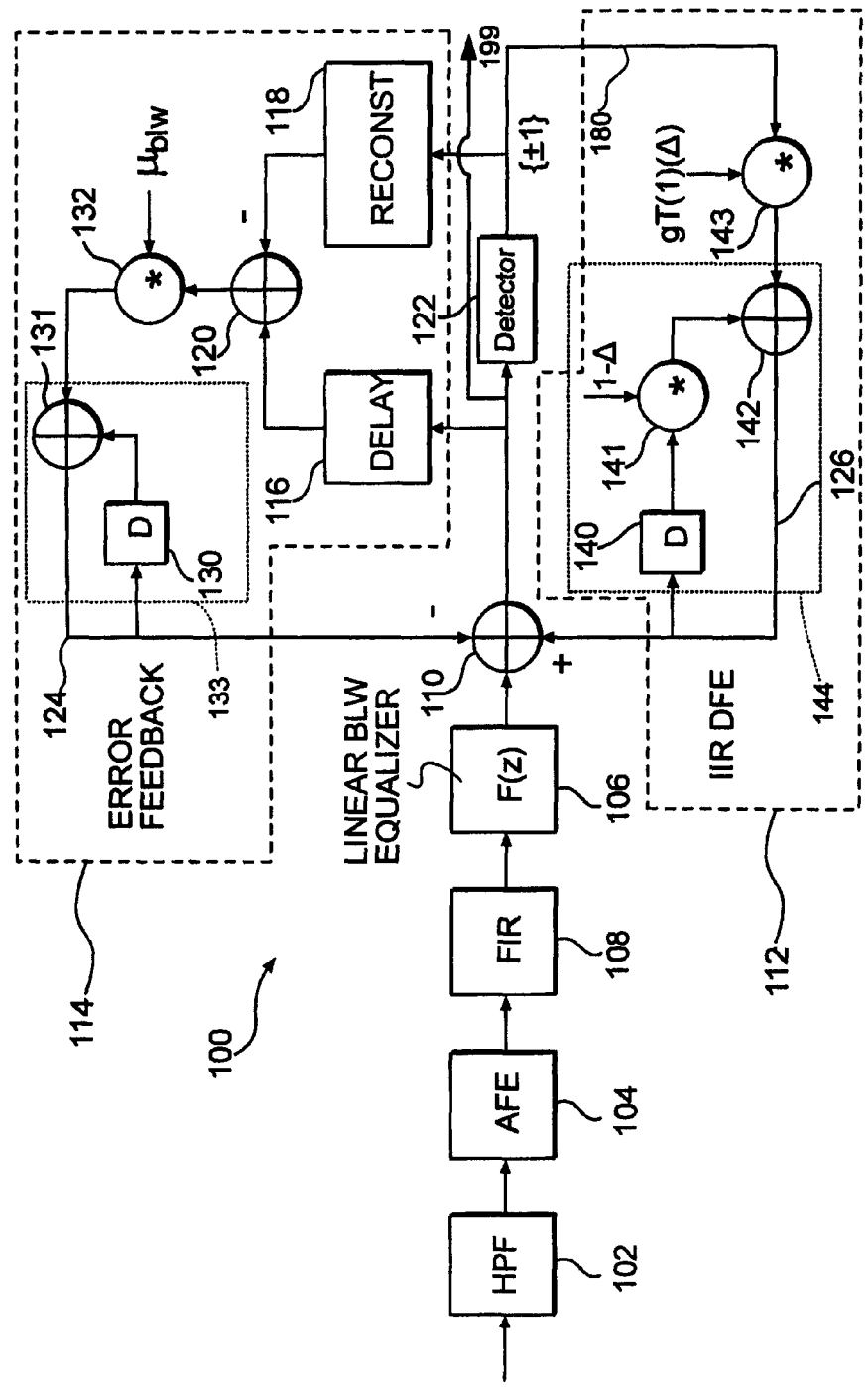
FIG. 1 shows a first detailed embodiment of a compensation system constructed according to the principles of the invention, including a linear BLW equalizer, error feedback loop and a decision feedback equalizer.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

FIG. 1 shows a compensation system 100, including three primary components: an equalizer 106, such as a linear baseline wander (BLW) equalizer, an error feedback component 114 and a decision feedback equalization (DFE) filter 112, such as a feed forward infinite impulse response (IIR) DFE filter. The outputs are of these three components combined in, and fed back to, a combiner 110 to produce an output 199 that is substantially free of undesirable signal characteristics, such as baseline wander. More specifically, the outputs of the linear BLW equalizer 106, the error feedback component 114 and the DFE filter 112 signal are concurrently combined in the combiner 110 to cancel baseline wander and produce the BLW compensated signal output at 199. Thus, the linear BLW equalizer 106, DFE 112 and error feedback filter 114 are integrated in a system 100 to compensate for baseline wander. Before the components in the system are described in detail, a brief overview of baseline wander and how these components generally function is provided.

Without baseline wander, an impulse response would be 1 at t=0, and 0 for t>0. Nevertheless, real world constraints form baseline wander in impulse responses. The goal of the invention is to have baseline wander correction and make the impulse as close as possible to a baseline-wander-free impulse response. The function of the linear BLW equalizer 106 is to remove the BLW after an initial impulse response, such as from t=0 to t=20 T, where T is the bit duration. Theoretically, the DFE 112 removes the residual baseline wander (tail) for t>20 such that the signal is substantially free of baseline wander. In reality, the baseline wander compensation by the linear BLW equalizer 106 and the DFE 112 may not be ideal and, moreover there may be random noise. The function of the error feedback filter 114 is to compensate (track) for any remaining baseline wander.

Turning now to the details shown in FIG. 1, the input signal received by linear BLW equalizer 106 may be generated by one or more upstream devices such as a high pass filter (HPF) 102. The HPF 102 eliminates a low frequency portion of the signal but may generate distortion such as baseline wander. This distorted signal may be input to other devices such as an analog front-end (AFE) component 104, which can be any analog device such as a continuous time filter, analog to digital converter, and/or other device that converts analog to digital signals. The output of the analog front-end component 104 may be then input to a finite impulse response (FIR) 108 device, which then outputs to the linear BLW equalizer 106 to form an output linearly equalized relative to the distorted input signal. In the FIG. 1 embodiment, the linear BLW equalizer 106 is arranged after the FIR 108, however an opposite arrangement may also be employed.

The output of linear BLW equalizer 106 is input to the combiner 110, and combined with the outputs of the DFE 112 and error feedback component 114 as discussed above. Before the output of combiner 110 is input to the DFE 112 and the error feedback component 114, it may be input to a detector 122, such as a sequence detector, which more specifically may be a Viterbi device. The Viterbi device operates in accordance with a known Viterbi algorithm.

The outputs from the combiner 110 and the detector 122 are input to the error feedback component 114. More specifically, the output form the combiner 110 is input to a delay 116 and the output from detector 122 is input to a reconstruction filter 118. The outputs from the delay device 116 and the reconstruction filter 118 are then combined in a combiner 120, and scaled by a scaler 132, such as a multiplier, which multiplies the combiner 120 output by a scaling factor of a $\mu_{blw}$. The output of the scaler 132 is fed to an integrator 133, which may be implemented as a combiner 131 that includes a delay block 130. This resultant signal is then fed back through feedback loop 124 to the combiner 110.

Turning now to the DFE 112, the output 180 of the detector 122 is also input to the DFE filter 112. More specifically, the output from the detector 122 is input to a scaler 143, such as a multiplier. The scaler 143 includes a scaling factor such as $gT(1)\Delta$, where $$g = \frac{1}{1+\pi\alpha} \text{ and } \Delta = \frac{2\pi\alpha}{1+\pi\alpha}.$$

The output of the scaler 143 then is input to an integrator 144. The integrator 144 may employ a combiner 142 that integrates with a feedback through a delay block 140 and a scaler 141. The scaler 141 may employ a multiplier that receives a scaling factor of $1-\Delta$. This resultant signal is then fed back through feedback loop 126 to the combiner 110.

In the manner described above, the signals from the linear BLW equalizer 106, the error feedback component 114 and the DFE filter 112 are combined in combiner 110 such that the resultant signal 199 output from combiner 110 is compensated for the baseline wander. The FIG. 1 system may operate with, at least in part, the following transfer function: $H(z)F(z)=g(1-\Delta[z^{-L}+(1-\Delta)z^{-L-1}+(1-\Delta)^2 z^{-L-2}+ \ldots])$ wherein $H(z)$ is the high-pass filter response, $$g = \frac{1}{1+\pi\alpha}, \quad \Delta = \frac{2\pi\alpha}{1+\pi\alpha},$$

L is the delay of the DFE filter, and $\alpha$ is the fractional corner frequency. However, any other transfer function that reduces or removes baseline wander is also contemplated by the invention.

Figure 2:
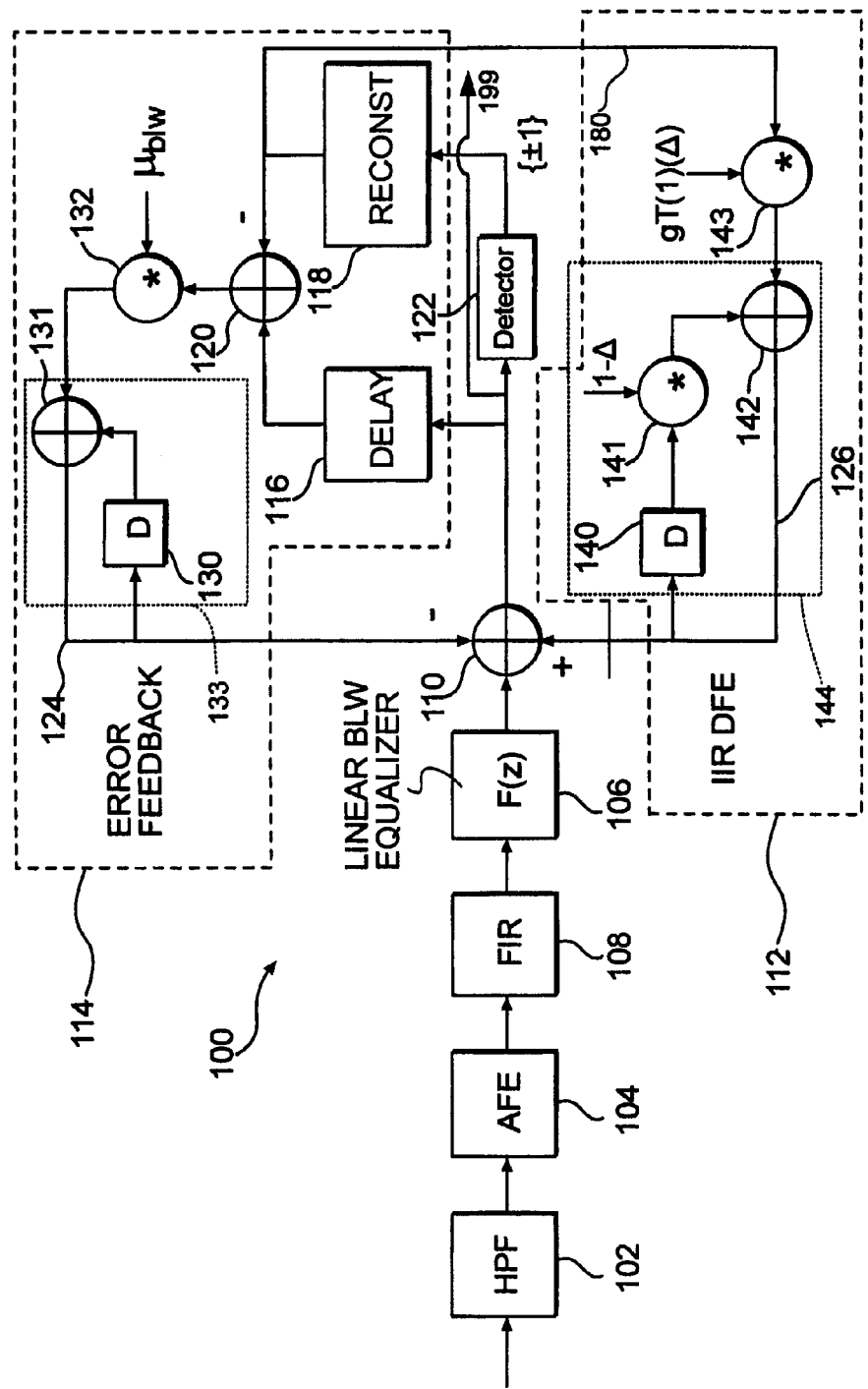
FIG. 2 shows a second detailed embodiment of the compensation system constructed according to the principles of the invention, in which a detector is not directly feeding the decision feedback equalizer.

FIG. 2 shows a second embodiment of the invention in which the detector 122, which again may be a sequence detector or more specifically a Viterbi device, is configured in a different manner. In the FIG. 2 embodiment, the output of the detector 122 is not directly input to the DFE filter 112 as in the FIG. 1 embodiment. Rather, the DFE filter 112 receives a signal from the error feedback component 114. More specifically, the output from the detector 122 is input to the reconstruction filter 118 and the output 181 of the reconstruction filter 118 is input to scaler 143, such as a multiplier of the DFE filter 112, which is fed back to the combiner 110 in a manner similar to FIG. 1. The output from reconstruction filter 118 of the error feedback component 114 also is combined with the output from delay 116 in the combiner 120, and the rest of the system operates similarly to the FIG. 1 embodiment.

Figure 3:
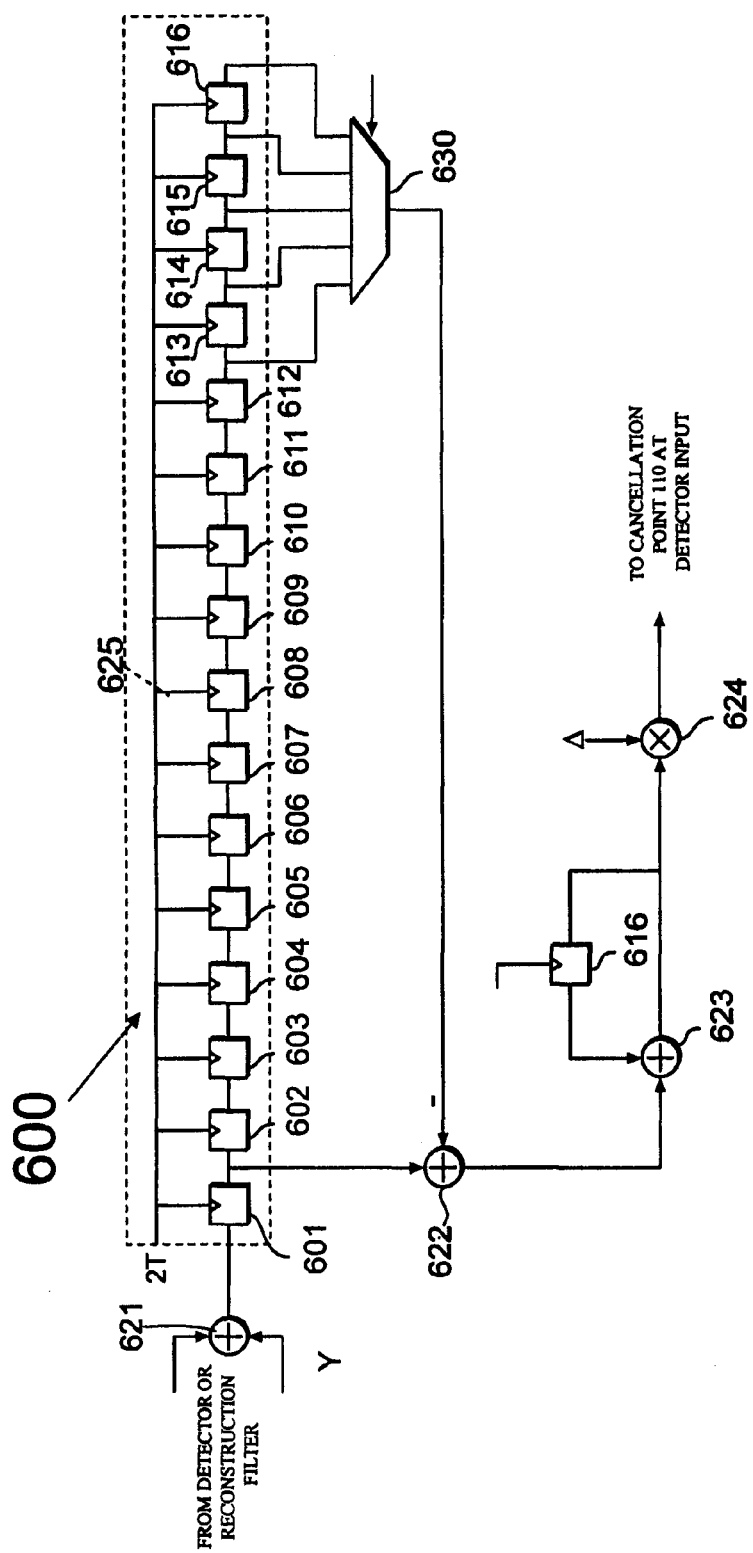
FIG. 3 shows a feed forward filter constructed according to the principles of the invention, which may be used as a finite impulse response filter.

FIG. 3 shows a feed forward filter 600 that may be used as the FIR filter 108. According to this embodiment, a combiner 621 outputs a signal to a delay line, which may include a series of storage devices 601-616. The signal applied to the first storage device shifts the input to the right for each time period. A selector, such as a multiplexer 630, controlled by suitable control logic, acts as a delay selector for the delay line and selects a signal from one of the storage devices 612-616, which may be implemented as Q flip-flops. The output of the delay selector 630 is output to a combiner 622. The combiner 622 sums that signal together with an output from the storage device 601. The output of the combiner 622 is then output to another combiner 623 for further processing in the feed forward filter with a storage device 616 and a scaler 624, such as a multiplier. The scaler 624 receives a further scaling factor of $\Delta$. The output is input to the BLW equalizer 106 as shown in FIGS. 1, 2, and 4.

In the FIG. 3 embodiment, the feed forward filter accumulator may be simply initialized to zero in the preamble.

Figure 4:
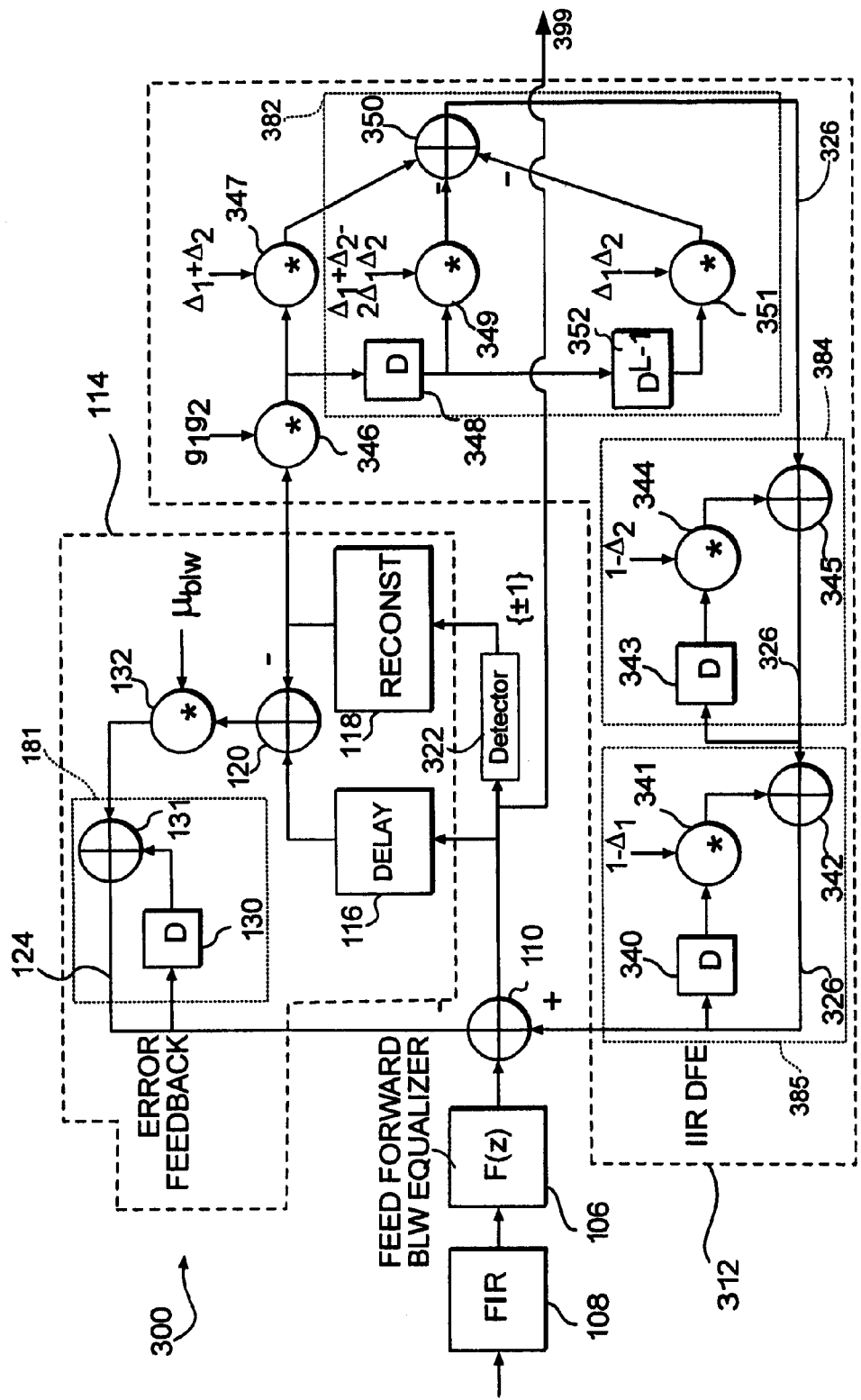
FIG. 4 shows a third embodiment of the compensation system constructed according to the principles of the invention similar to the FIG. 2 embodiment, but having a second pole.

FIG. 4 shows a third embodiment of the invention 300 that is similar to the FIG. 2 embodiment, but includes a second pole configured to operate with another transfer function. In particular, all of the components except for DFE filter 312, which may be a feed forward infinite impulse response (IIR) DFE filter, operate similarly to the FIG. 2 implementation. In the FIG. 4 embodiment, the input to the DFE 312 is received from the reconstruction filter 118 similar to the FIG. 2 embodiment. However, in the FIG. 4 embodiment, the signal output from reconstruction filter 118 is input to a scaling device 346, such as a multiplier that may receive a scaling input of $g_1 g_2$, where $$g_j = \frac{1}{1+\pi\alpha_j}.$$

The scaler 346 then outputs to a scaler 347, such as a multiplier. The scaler 347 also may receive a scaling input signal of $\Delta_1+\Delta_2$. The scaler 346 also outputs to an integrator 382, which in this embodiment may include a delay blocks 348, 352, scalers 349, 351, and combiner 350 that integrate the received signal. The output of the scaler 347 is also input into the combiner 350. The output of the delay block 348 is input to the scaler 349, such as a multiplier which may receive a scaling input of $\Delta_1+\Delta_2-2\Delta_1\Delta_2$. The scaler 349 output is also input to the combiner 350. The output of the delay block 348 is also input to another delay block 352. The delay block 352 outputs to a scaler 351, such as a multiplier, which may receive a scaling input of $\Delta_1\Delta_2$. The output of the scaler 351 also is input to the combiner 350. Accordingly, the combiner 350 receives and sums the outputs from scaler 347, scaler 349, and scaler 351. The resultant signal is an integration of the input from the scaler 346 output.

The output of the combiner 350 is then input in the feedback loop 326 of the DFE filter 312, which may include two integrators 384, 385. The integrator 384 may be implemented as a combiner 345 that receives a feedback from a delay block 343 and a scaler 344 such as a multiplier. The scaler 344 may also receive a scaling input of $1-\Delta_2$. The output of combiner 345 is input to the integrator 385, which may include a combiner 342 that receives a delay block 340 signal through a scaler 341, such as a multiplier that may include a scaling input signal $1-\Delta_1$. The output of the scaler 341 is input to the combiner 342 which outputs a signal that has been integrated twice. The resultant integrated signal output from combiner 110 forms the compensated signal 399, which is combined with the baseline signal to form a compensated signal.

As noted above, the FIG. 4 device differs from the FIG. 1 and FIG. 2 devices in that it has a higher order set of system components, thus creating a second pole, to produce a higher quality, more precise output/error compensation signal in some aspects. More specifically, the FIG. 4 system includes a combination of filter components and modules that may operate with the following transfer function:

$$H(z)F(z) = g_1 g_2 \left(1 - z^{-L} \frac{\Delta_1 + \Delta_2 - (\Delta_1 + \Delta_2 - 2\Delta_1\Delta_2)z^{-1} - \Delta_1\Delta_2 z^{-L}}{(1-(1-\Delta_1)z^{-1})(1-(1-\Delta_2)z^{-1})}\right)$$

wherein $$g_j = \frac{1}{1+\pi\alpha_j}, \Delta_j = \frac{2\pi\alpha_j}{1+\pi\alpha_j} \text{ for } j = 1, 2,$$

L is the length of the FIR filter, and $\alpha_1$ and $\alpha_2$ are the read-channel and preamp fractional pole locations, respectively.

Figure 5:
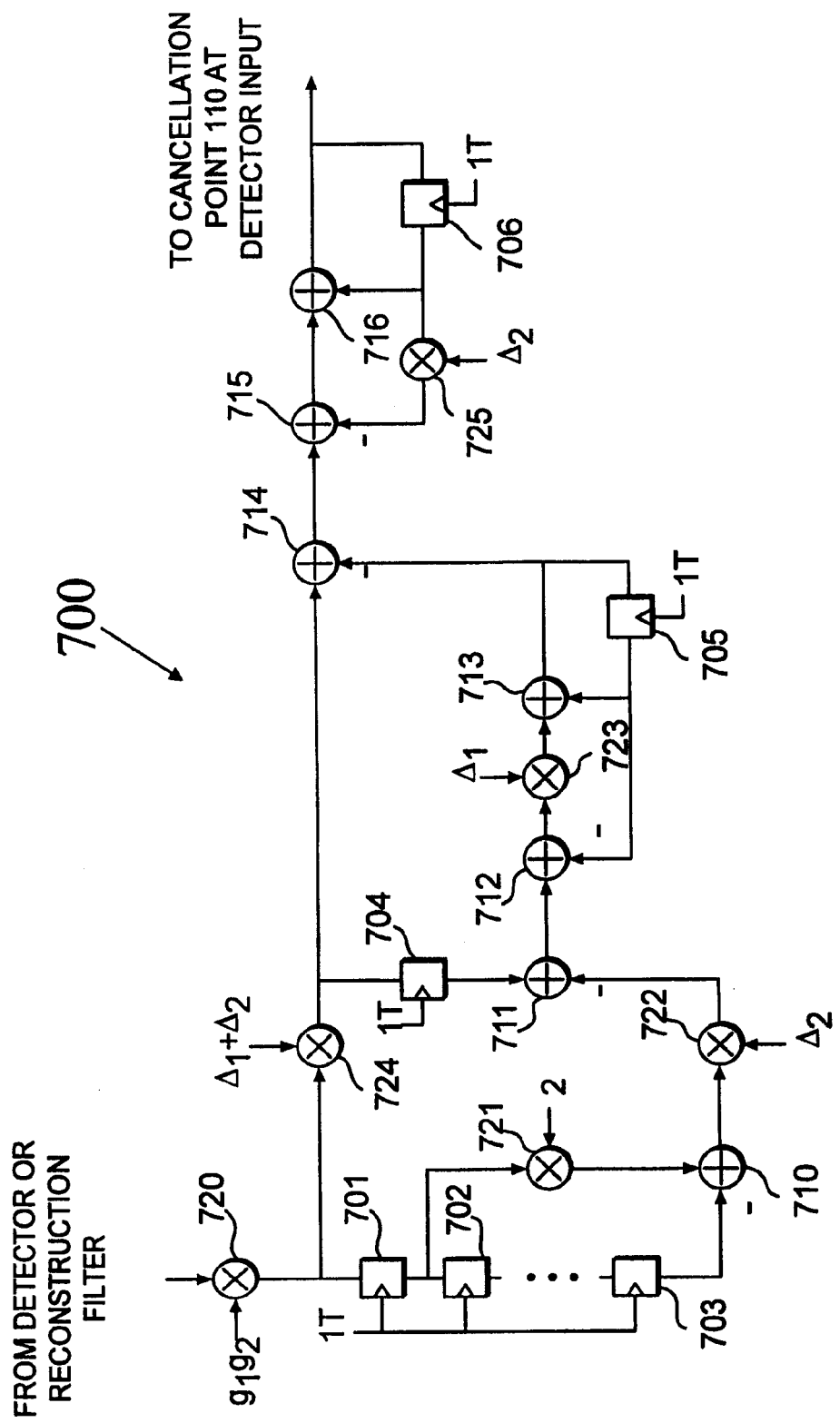
FIG. 5 shows a feedback filter layout constructed according to the principles of the invention, which maybe used as a decision feedback equalization filter.

FIG. 5 shows a block diagram of one embodiment of a DFE filter that may be employed in the invention. The FIG. 5 DFE filter 700 may be responsive to an input from either the detector 122, as in FIG. 1, or from the reconstruction filter 118, as in FIGS. 2 and 4, and outputs a filtered signal to a cancellation point, such as the combiner 110. In particular, in the FIG. 5 DFE filter, an input to a scaler 720, such as a multiplier is scaled by a scaling input $g_1 g_2$, where $$g_j = \frac{1}{1+\pi\alpha_j},$$

and the output of the scaler 720 is then input to a series of storage devices 701-703, which may be Q flip-flops that cascade the signal based on a common clock signal (1 T). It should be apparent that the storage devices 701 to 703 may include more or less storage devices than shown. The storage devices 701 to 703 output to a scaler 721, such as a multiplier, which may also receive a scaling input of two. The scaler 721 outputs to a combiner 710, which also receives an input from one of the storage devices 701-703, as a negative signal. The combiner 710 outputs to a scaling device 722, such as a multiplier, which may also receive a scaling input of $\Delta_2$. The output of scaler 722 is then input, as a negative signal, to a combiner 711.

The output of scaler 720 also is input to a scaler 724, such as a multiplier, which receives a scaling input of $\Delta_1+\Delta_2$, where $$\Delta_j = \frac{2\pi\alpha_j}{1+\pi\alpha_j}.$$

The output from scaler 724 is branched. The first branch includes another storage device 704, which outputs to a combiner device 711, and the second branch includes a combiner 714.

The output from the combiner 711 in the first branch is input to a combiner 712, which also receives an additional input, as a negative signal, from a storage device 705 described below. The output of combiner 712 is input to a scaling device 723, such as a multiplier having a scaling value of $\Delta_1$. The output of the scaler 723 is received by the combiner 713 together with the additional input from storage device 705. The additional value that has been input to combiners 712 and 713 is from storage device 705, which receives an input from the combiner 713. The combiner 713 outputs, as a negative signal, to a combiner 714, which also receives an input from a scaler 724.

The combiner 714 in the second branch outputs to a combiner 715, which outputs to a combiner 716. The output of combiner 716 is fed to storage device 706, combiner 716 and scaler 725. The scaler 725 also receives an input of $\Delta_2$. Finally, the output of the combiner 716 in input to the combiner 110, which outputs the compensated signal 199.

In FIG. 5 embodiment, the accumulator may be a high pass accumulator and the contents of this accumulator may change rapidly. For example, the contents may change between two values during the preamble. This problem is solved by correctly detecting the phase of the preamble pattern and loading the accumulator with the correct value. Another option may be to rearrange the block diagrams so that the high pass filter is described as HPF=1−LPF. The corresponding accumulator is then a low pass filter and can be safely initialized to a zero during the preamble.

Figure 6:
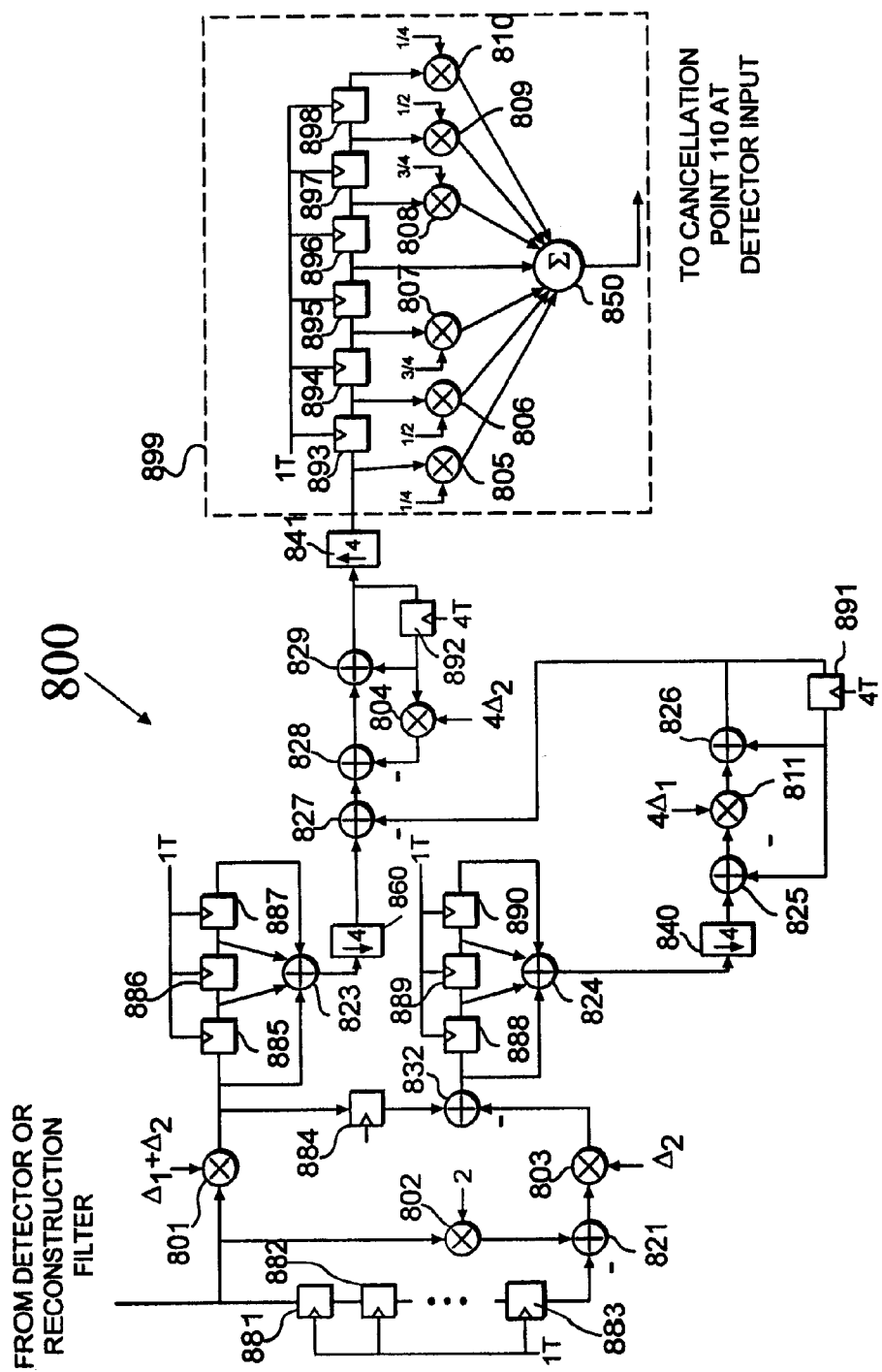
FIG. 6 is another exemplary feedback filter that may be used as a decision feedback equalization filter, which has an interpolation filter providing higher resolution than the FIG. 5 embodiment.

FIG. 6 shows another embodiment of a DFE filter 800 of the invention that provides higher resolution than the FIG. 5 embodiment and includes an interpolation filter. This input to filter 800 is received in a series of data storage devices 881-883, such as Q flip-flops, which hold the input and shift data with a clock signal. The input is also received in scalers 801 and 802, which may be multipliers. It should be apparent that any number of scalers 881-883 may be employed.

The scaler 801 multiplies the signals by a scaling factor of $\Delta_1+\Delta_2$ and outputs a signal to a series of storage devices 885-887, such as Q flip-flops, and also to a storage device 884. The scaler 802 outputs a signal to a combiner 821, which sums the signal from the storage devices 881 to 883 and outputs, as a negative signal, to a scaler 803, such as a multiplier. The scaler 803 combines the signal from combiner 821 with a $\Delta_2$ signal. The scaler 803 outputs to a combiner 832, as a negative signal, which combines the signal with the output from the data storage device 884, such as a Q flip-flop. The output of the combiner device 832 outputs to a series of data storage devices 888 through 890. The output from storage devices 888-890 is input to a combiner 824, which outputs to a four times sampling device 840. The four times sampling device 840 outputs to a combiner 825, which outputs to a scaler 811 such as a multiplier that receives a $4\Delta_1$ signal. The scaler 811 outputs to a combiner 826, which also receives a signal from storage device 891. The output of combiner 826 is input, as a negative signal, to a combiner 827.

The combiner 827 also receives a signal from each of the storage devices 885-887, which have been summed in combiner 823, which outputs to a four times sampling device 850 before being input into combiner 827. The signal from combiner 827 is output to a combiner 828, which outputs to another combiner 829. The output of the combiner 829 is input to a four times sampling device 841. The combiner 828 also receives an output, as a negative signal, from the scaler 804 that receives an input of $4\Delta_2$ and also an output from data storage device 892. The combiner 829 also receives an input from a storage device 892.

The output of four times sampling device 841 is input to an interpolation filter 899 formed by storage devices 893-898, scalers 805-810, and combiner 850 described below. The interpolation filter 899 incrementally sums a plurality of values based on weights input to the scalers 805-810. In this regard, the FIG. 6 embodiment performs a linear interpolation at successive 4 T outputs. In particular, the output of four times sampling device 841 is input to a series of data storage devices 893-898. The outputs from these storage devices 893-898 are input into scalers 805-810, which include an input of a weighting factor. Each of the outputs of the scalers 805-810 is input to a combiner 850. The combiner 850 outputs to the cancellation point at the detector output such as combiner 110.

In additional embodiments, the storage device 884, which may be a flip-flop, can be eliminated. This allows the savings of flip-flops in a delay pipe as the inputs can be summed before delaying them. This results in a tiny loss associated with removing or eliminating this "nuisance" flip-flop in storage device 884.

Figure 7:
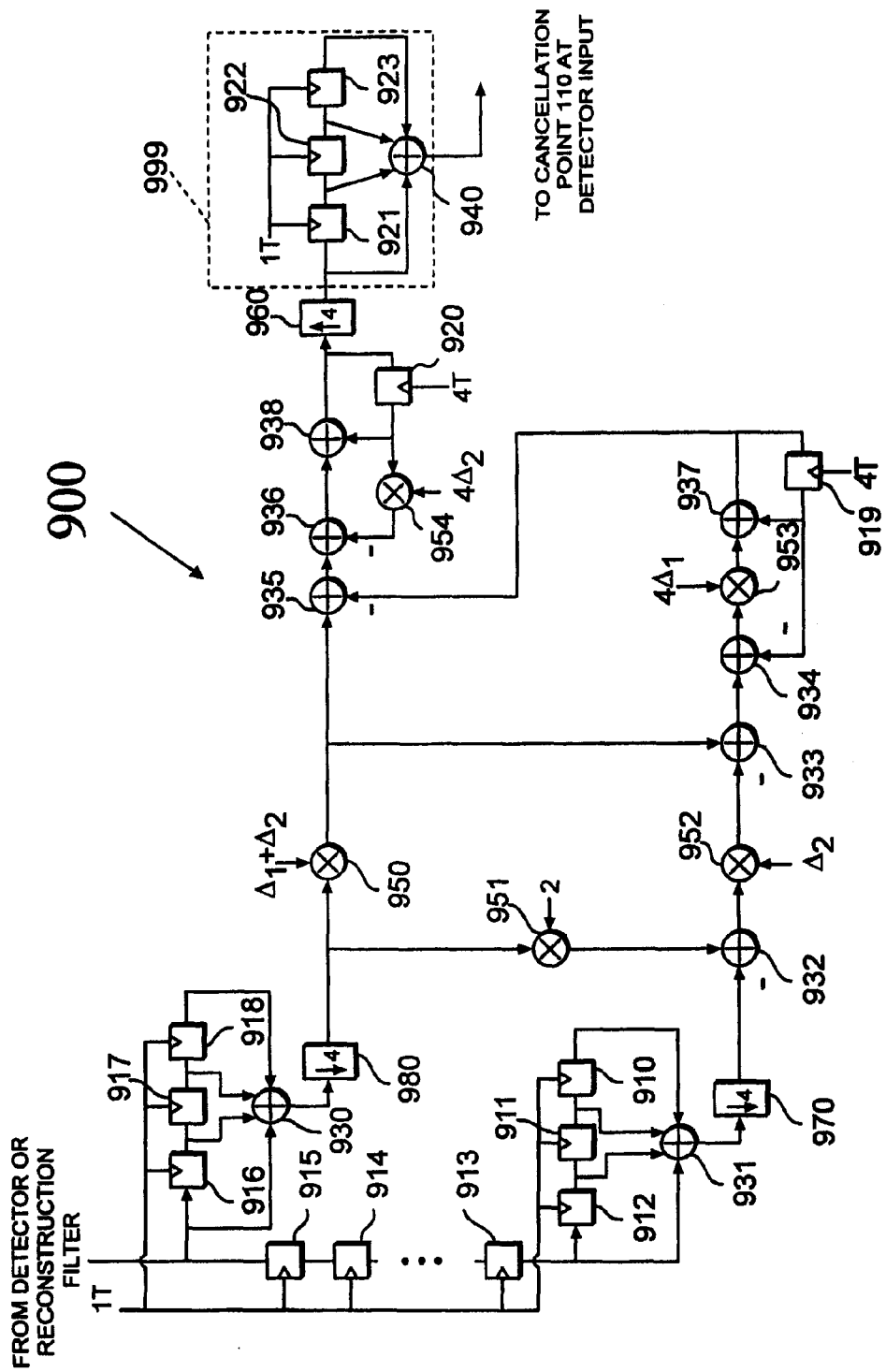
FIG. 7 shows another embodiment of a decision feedback equalization filter that has lower resolution than the FIG. 6 embodiment.

As shown in FIG. 7, a DFE filter 900 is similar to the FIG. 6 embodiment, but removes at least the nuisance flip-flop and has a lower resolution interpolation filter.

The input to the DFE filter 900 shown in FIG. 7 is directed to storage devices 916-918 and storage devices 913-915, which again may be flip-flops that shift data with a common clock signal. Storage devices 916-918 output to a combiner 930. The output of the combiner 930 is input to a four times sampling device 980. The output of the sampling device 980 is input to a scaler 950 described below, and to a scaler 951, such as a multiplier that may receive a predetermined scaling factor 2, which outputs to a combiner 932, as a negative signal, which also receives the output from a sampling device 970 described below.

Storage devices 913-915 output to storage devices 910-912. Outputs of all these devices 910-912 are input to a combiner 931, which outputs to a four times sampling device 970. The combiner 932 receives an input from the sampling device 970 and outputs to a combiner 952 such as a multiplier, which also receives scaling input of $\Delta_2$. The scaler 950, such as a multiplier, also receives scaling factor of $\Delta_1+\Delta_2$. The outputs of the scalers 950 and 952, as a negative signal, are summed in the combiner 933. The output of the scaler 950 is also input to a combiner 935, such as a multiplier. The combiner 933 outputs to a combiner 934, which is input into the scaler 953. The scaler 953 also receives a scaling input of $4\Delta_1$. The output of the scaler 953 is input to a combiner 937. The output of the combiner 937 is input to storage device 919 clocked at 4 T, which outputs both to the combiner 934 and a combiner 937. The output of the combiner 937 also is received by a combiner 935, as a negative signal. The combiner 935 outputs to the combiner 936, which outputs to a combiner 938. The combiner 938 also receives an input from storage device 920, which is received as an input from the combiner 938. Storage device 920 also inputs to a scaler 954 such as a multiplier, which receives an additional scaling input of $4\Delta_2$. The output of the scaler of 954 is input to a combiner 936, as a negative signal. The output from the combiner 938 also is received in a four times sampling device 960. The output of the sampling device 960 is input into an interpolation filter 999 formed by storage devices 921-923 and combiner 940. The storage devices 921 to 923 shift data with a common clock signal. The outputs of storage devices 921 to 923 are input to combiner 940, which outputs to the cancellation point, such as the combiner 110.

Figure 8:
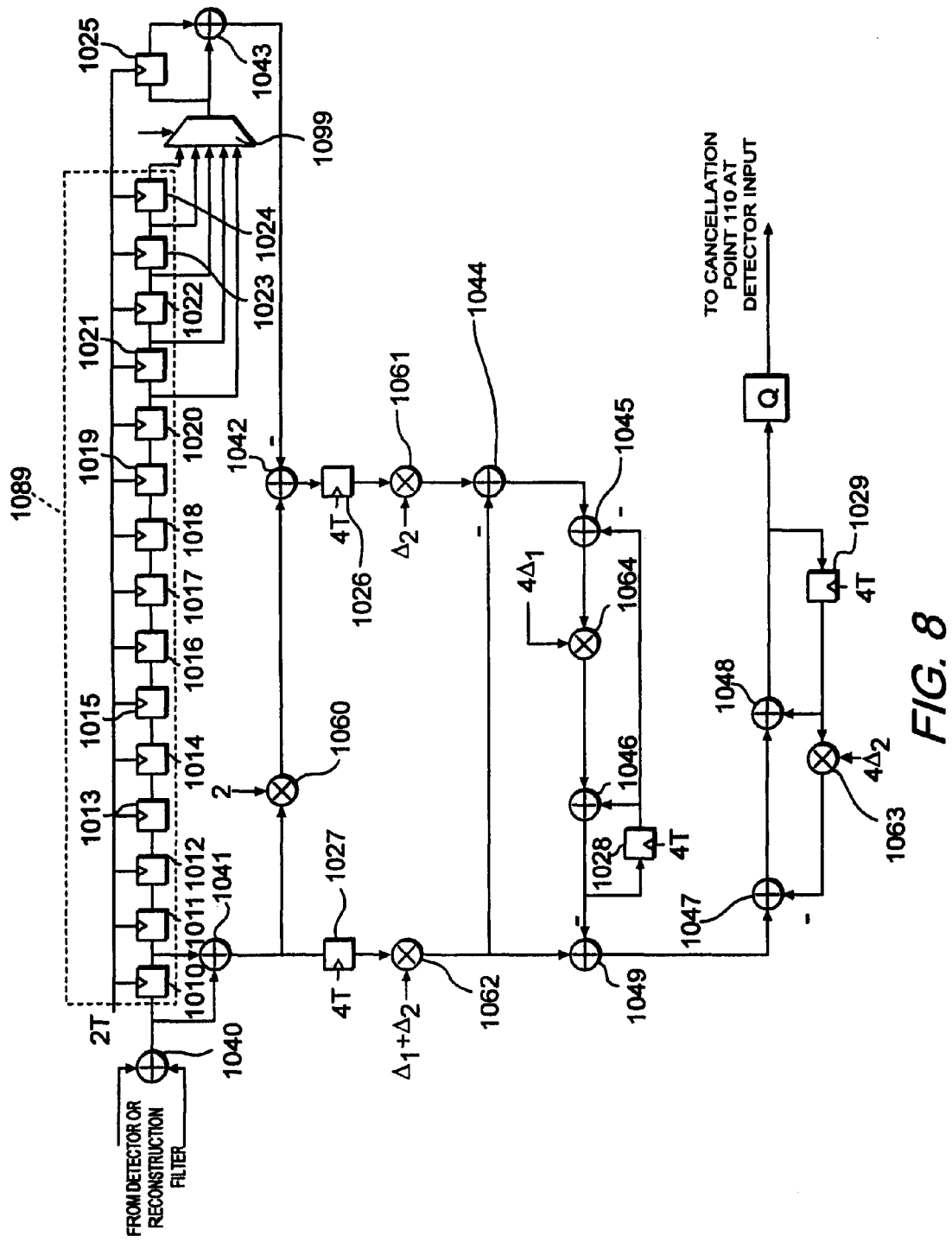
FIG. 8 shows yet another feedback filter that may be used as a decision feedback equalization filter which has a delay line constructed according to the principles of the invention.

FIG. 8 shows another exemplary feedback filter having a delay line and which may be used as a DFE filter of the invention, such as filter 312, for example. The approach shown in FIG. 8 includes a series of storage devices 1010-1025, which form a delay line 1089, that receive an input from a combiner 1040. Storage devices 1010-1025 may be Q flip-flops that output directly or indirectly to a delay selector 1099, such as a multiplexer. The output of delay selector 1099 is input to a combiner 1043, together with an output from storage device 1025. The combiner 1043 outputs, as a negative signal, to another combiner 1042. The combiner 1042 receives an additional signal from a scaler 1060. The scaler 1060 also receives an input from combiner 1041 and an input of two. The combiner 1041 receives inputs from one of the storage devices 1010-1025 and from combiner 1040, and outputs to scaler 1060, as noted above, and to a storage device 1027 that is clocked at 4 T.

The combiner 1042 outputs to a storage device 1026 that is clocked at 4 T. Storage device 1026 outputs to a scaler 1061 that also receives an input of $\Delta_2$. The scaler 1061 outputs to a combiner 1044. The combiner 1044 also receives an input, as a negative signal, from a scaler 1062. The scaler 1062 receives an input from the storage device 1027 and an input of $\Delta_1+\Delta_2$. Storage device 1027 receives an input from the combiner 1041, as noted above.

The combiner 1044 outputs to a combiner 1045, which outputs to a scaler 1064. The scaler 1064 receives an input $4\Delta_1$. The scaler 1064 outputs to combiner 1046 that outputs to combiner 1049. The combiner 1046 also outputs to a storage device 1028 that is being clocked at 4 T. The output of storage device 1028 is input to the combiner 1046 and the combiner 1045, as a negative signal.

The combiner 1049 outputs to a combiner 1047, which outputs to a combiner 1048. The combiner 1048 outputs to a storage device 1029, which is clocked at 4 T. The storage device 1029 outputs to the combiner 1048 and also to scaler 1063. The scaler 1063 receives a $4\Delta_2$ input and scaler 1063 inputs to combiner 1047, as a negative signal. The output of combiner 1048 is fed back to the cancellation point, such as combiner 110.

Figure 9:
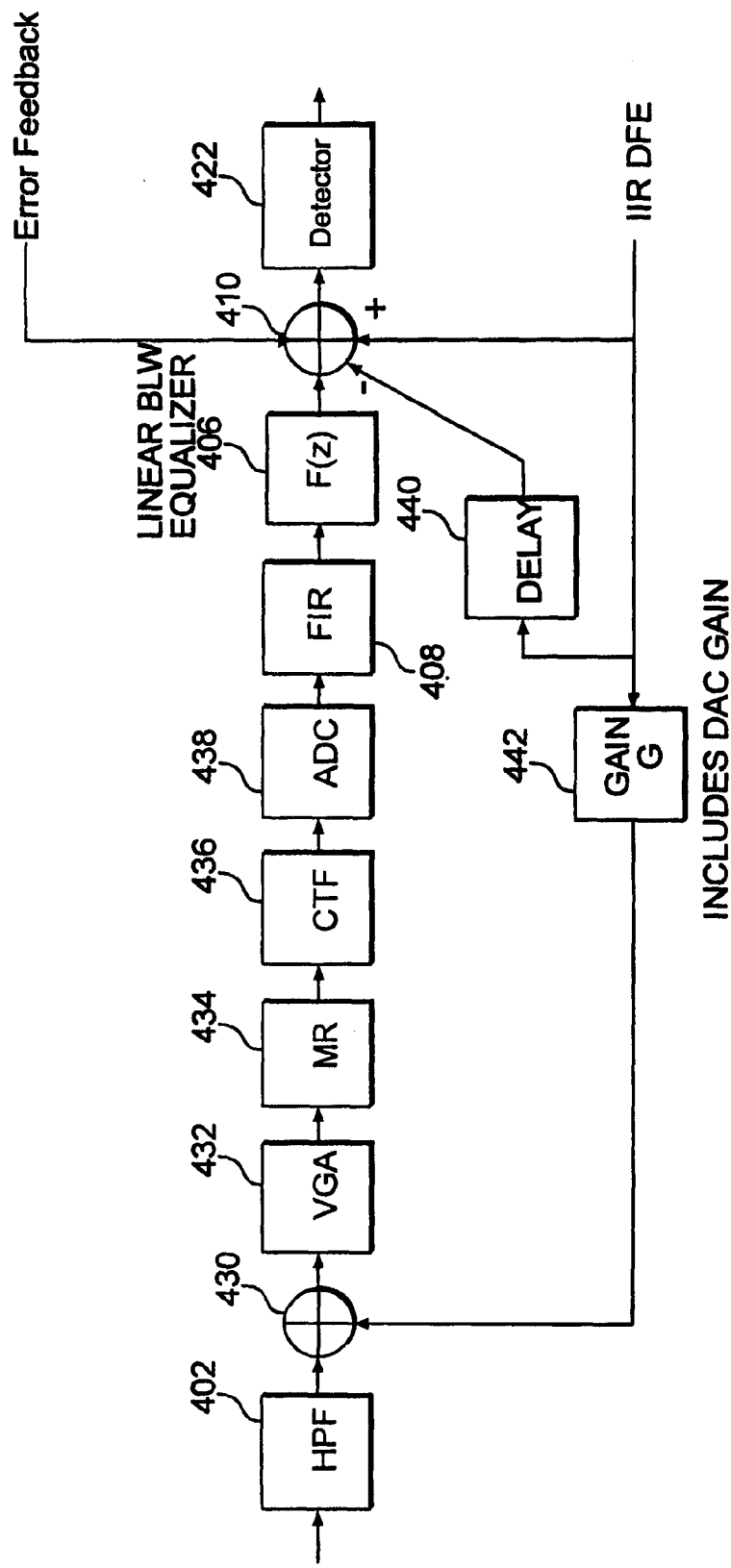
FIG. 9 shows exemplary analog cancellation system layout constructed according to the principles of the invention that may be used with the FIG. 1 system.

FIG. 9 is directed to a system providing an analog cancellation operation. The analog cancellation operation may be used in conjunction with the compensation systems of the invention described herein or similar systems. The analog cancellation operation receives an input from an error feedback component of the invention such as 114, and from an IIR DFE filters of the invention, such as filters 112, 312. The input from the DFE also is input into a gain device 442 that may include a DAC gain. The input from the DFE filter is also input to a delay 440 and a combiner 410.

The gain device 442 outputs a signal to a combiner 430. The combiner 430 also receives a signal from a high pass filter 402. The output of combiner 430 is input into a variable gain amplifier (VGA) module 432, then sequentially to a MR Asymmetry Correction block 434, followed by a continuous time filter (CTF) module 436. Thereafter the signal is output to an analog to digital converter 438 and then input into a FIR device 408. The output from the FIR device 408 is input into linear BLW equalizer device 406.

The output from the linear BLW equalizer 406 is input to the combiner 410, which also receives the output from the delay device 440. Similar to combiner 110, these signals are combined with the output signals from the error feedback component and DFE of the invention, to produce a compensation system as described. All the signals are summed and the output from combiner 410 is then input into the detector 422 for processing as described in conjunction with FIG. 4. Accordingly, the analog cancellation device of FIG. 9 allows for reducing the baseline wander in analog domain.

The embodiments of the invention described herein reduce or remove undesirable signal characteristics, such as baseline wander, by integrating aspects of three different signal compensation approaches in unique ways to produce a novel compensation system. In particular, aspects of a linear BLW equalizer 106 have been integrated with an error feedback loop and a DFE filter to provide for optimal compensation. Moreover, the decision feedback equalization filter can be a double pole system providing higher order signal processing. However, it is contemplated that the other similar filter types may be substituted for the above described filters. Moreover, different arrangements of the above noted filters are also within the scope of the invention.

It has been further found that the difference between the single pole implementation of the compensation system, such as shown in FIGS. 1 and 2 and the double pole compensation system, such as shown in FIG. 4, can be minimal or can be very large depending on the circumstances. In particular, when the single pole versus double pole systems were compared with a 0.015% preamp pole and 0.04% read-channel pole in the double pole system, such as the FIG. 4 system, the worst case was within 0.2 dB. On the other hand, the double pole system showed significant improvement when a 0.1% preamp pole and 0.2% read channel pole were used. In particular, the difference between the single pole and double pole during a worst case pattern suffered a huge loss of 2.75 dB. Accordingly, the two-pole system can improve signal compensation in certain situations, particularly if the processing demands are not too high. However, the complexity of the double pole system will increase manufacturing cost, chip timing and temperature. Accordingly, a single pole system will have at least these advantages.

Figure 10:
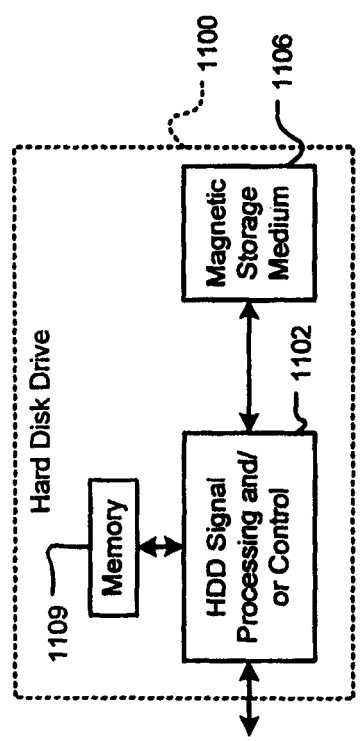
FIGS. 10, 11, 12, 13, 14, 15, and 16 show various exemplary implementations of the invention.

Referring now to FIG. 10, the invention can be implemented in a hard disk drive 1100. The invention may implement either or both signal processing and/or control circuits, which are generally identified in FIG. 10 at 1102. In some implementations, the signal processing and/or control circuit 1102 and/or other circuits (not shown) in the HDD 1100 may process data, perform coding and/or encryption, perform calculations, and/or format data that is output to and/or received from a magnetic storage medium 1106.

The HDD 1100 may communicate with a host device (not shown) such as a computer, mobile computing devices such as personal digital assistants, cellular phones, media or MP3 players and the like, and/or other devices via one or more wired or wireless communication links 1108. The HDD 1100 may be connected to memory 1109 such as random access memory (RAM), low latency nonvolatile memory such as flash memory, read only memory (ROM) and/or other suitable electronic data storage.

Figure 11:
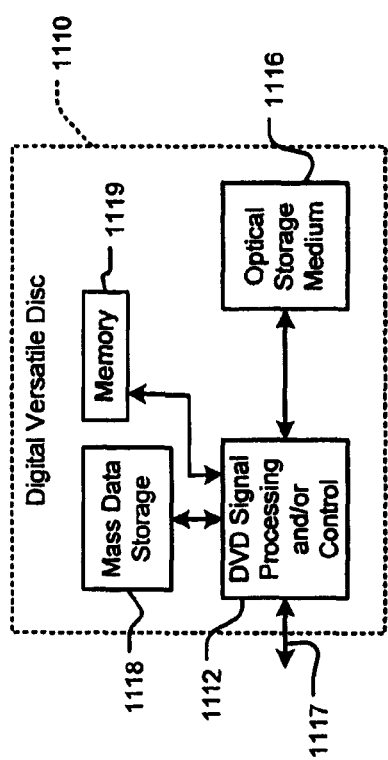

Referring now to FIG. 11, the invention can be implemented in a digital versatile disc (DVD) drive 1110. The invention may implement either or both signal processing and/or control circuits, which are generally identified in FIG. 11 at 1112, and/or mass data storage of the DVD drive 1110. The signal processing and/or control circuit 1112 and/or other circuits (not shown) in the DVD 1110 may process data, perform coding and/or encryption, perform calculations, and/or format data that is read from and/or data written to an optical storage medium 1116. In some implementations, the signal processing and/or control circuit 1112 and/or other circuits (not shown) in the DVD 1110 can also perform other functions such as encoding and/or decoding and/or any other signal processing functions associated with a DVD drive.

The DVD drive 1110 may communicate with an output device (not shown) such as a computer, television or other device via one or more wired or wireless communication links 1117. The DVD 1110 may communicate with mass data storage 1118 that stores data in a nonvolatile manner. The mass data storage 1118 may include a hard disk drive (HDD). The HDD may have the configuration shown in FIG. 11. The HDD may be a mini HDD that includes one or more platters having a diameter that is smaller than approximately 1.8". The DVD 1110 may be connected to memory 1119 such as RAM, ROM, low latency nonvolatile memory such as flash memory and/or other suitable electronic data storage.

Figure 12:
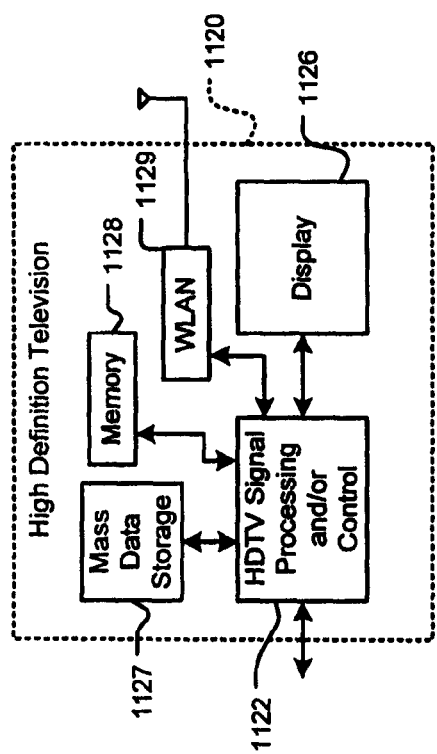

Referring now to FIG. 12, the invention can be implemented in a high definition television (HDTV) 1120. The invention may implement either or both signal processing and/or control circuits, which are generally identified in FIG. 12 at 1122, a WLAN interface and/or mass data storage of the HDTV 1120. The HDTV 1120 receives HDTV input signals in either a wired or wireless format and generates HDTV output signals for a display 1126. In some implementations, signal processing circuit and/or control circuit 1122 and/or other circuits (not shown) of the HDTV 1120 may process data, perform coding and/or encryption, perform calculations, format data and/or perform any other type of HDTV processing that may be required.

The HDTV 1120 may communicate with mass data storage 1127 that stores data in a nonvolatile manner such as optical and/or magnetic storage devices. At least one HDD may have the configuration shown in FIG. 10 and/or at least one DVD may have the configuration shown in FIG. 11. The HDD may be a mini HDD that includes one or more platters having a diameter that is smaller than approximately 1.8". The HDTV 1120 may be connected to memory 1128 such as RAM, ROM, low latency nonvolatile memory such as flash memory and/or other suitable electronic data storage. The HDTV 1120 also may support connections with a WLAN via a WLAN network interface 1129.

Figure 13:
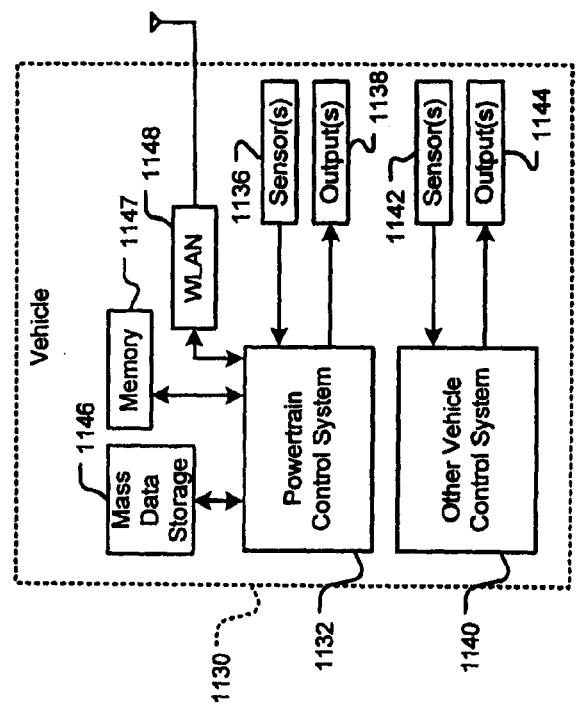

Referring now to FIG. 13, the invention implements a control system of a vehicle 1130, a WLAN interface and/or mass data storage of the vehicle control system. In some implementations, the invention implement a powertrain control system 1132 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The invention may also be implemented in other control systems 1140 of the vehicle 1130. The control system 1140 may likewise receive signals from input sensors 1142 and/or output control signals to one or more output devices 1144. In some implementations, the control system 1140 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1132 may communicate with mass data storage 1146 that stores data in a nonvolatile manner. The mass data storage 1146 may include optical and/or magnetic storage devices for example hard disk drives HDD and/or DVDs. At least one HDD may have the configuration shown in FIG. 10 and/or at least one DVD may have the configuration shown in FIG. 11. The HDD may be a mini HDD that includes one or more platters having a diameter that is smaller than approximately 1.8". The powertrain control system 1132 may be connected to memory 1147 such as RAM, ROM, low latency nonvolatile memory such as flash memory and/or other suitable electronic data storage. The powertrain control system 1132 also may support connections with a WLAN via a WLAN network interface 1148. The control system 1140 may also include mass data storage, memory and/or a WLAN interface (all not shown).

Figure 14:
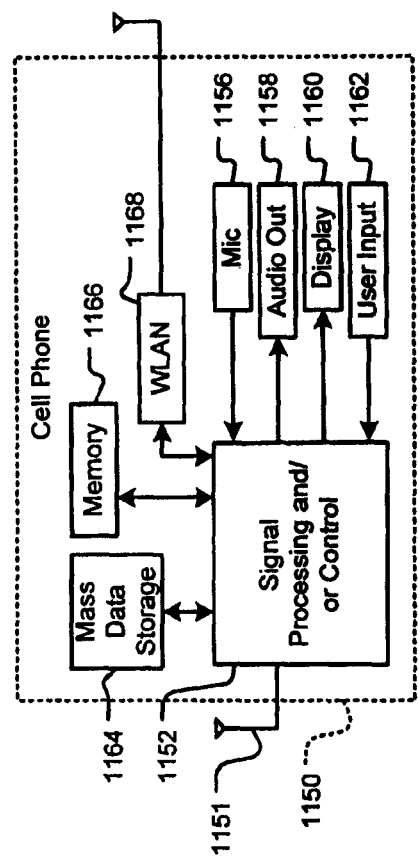

Referring now to FIG. 14, the invention can be implemented in a cellular phone 1150 that may include a cellular antenna 1151. The invention may implement either or both signal processing and/or control circuits, which are generally identified in FIG. 14 at 1152, a WLAN interface and/or mass data storage of the cellular phone 1150. In some implementations, the cellular phone 1150 includes a microphone 1156, an audio output 1158 such as a speaker and/or audio output jack, a display 1160 and/or an input device 1162 such as a keypad, pointing device, voice actuation and/or other input device. The signal processing and/or control circuits 1152 and/or other circuits (not shown) in the cellular phone 1150 may process data, perform coding and/or encryption, perform calculations, format data and/or perform other cellular phone functions.

The cellular phone 1150 may communicate with mass data storage 1164 that stores data in a nonvolatile manner such as optical and/or magnetic storage devices for example hard disk drives HDD and/or DVDs. At least one HDD may have the configuration shown in FIG. 9A and/or at least one DVD may have the configuration shown in FIG. 11. The HDD may be a mini HDD that includes one or more platters having a diameter that is smaller than approximately 1.8". The cellular phone 1150 may be connected to memory 1166 such as RAM, ROM, low latency nonvolatile memory such as flash memory and/or other suitable electronic data storage. The cellular phone 1150 also may support connections with a WLAN via a WLAN network interface 1168.

Referring now to FIG. 14, the invention can be implemented in a set top box 1180. The invention may implement either or both signal processing and/or control circuits, which are generally identified in FIG. 14 at 1184, a WLAN interface and/or mass data storage of the set top box 1180. The set top box 1180 receives signals from a source such as a broadband source and outputs standard and/or high definition audio/video signals suitable for a display 1188 such as a television and/or monitor and/or other video and/or audio output devices. The signal processing and/or control circuits 1184 and/or other circuits (not shown) of the set top box 1180 may process data, perform coding and/or encryption, perform calculations, format data and/or perform any other set top box function.

The set top box 1180 may communicate with mass data storage 1190 that stores data in a nonvolatile manner. The mass data storage 1190 may include optical and/or magnetic storage devices for example hard disk drives HDD and/or DVDs. At least one HDD may have the configuration shown in FIG. 9A and/or at least one DVD may have the configuration shown in FIG. 10. The HDD may be a mini HDD that includes one or more platters having a diameter that is smaller than approximately 1.8". The set top box 1180 may be connected to memory 1194 such as RAM, ROM, low latency nonvolatile memory such as flash memory and/or other suitable electronic data storage. The set top box 1180 also may support connections with a WLAN via a WLAN network interface 1196.

Figure 15:
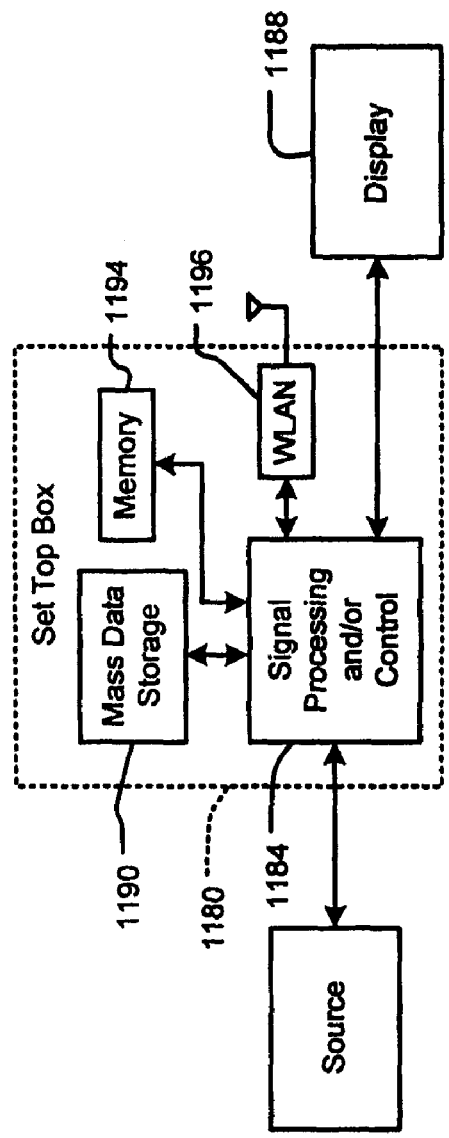
Figure 16:
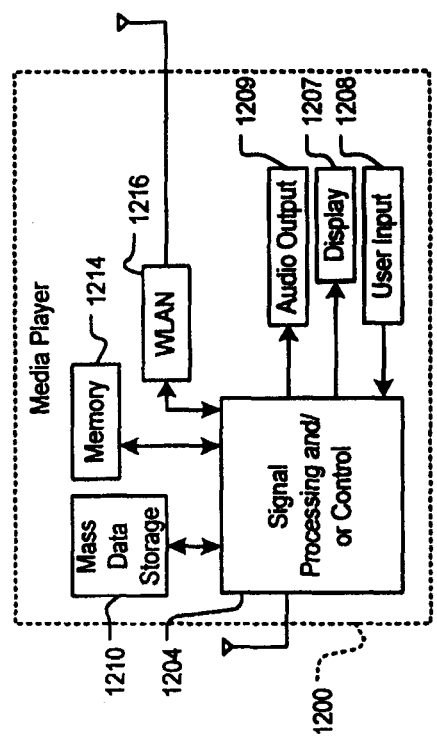

Referring now to FIG. 16, the invention can be implemented in a media player 1200. The invention may implement either or both signal processing and/or control circuits, which are generally identified in FIG. 15 at 1104, a WLAN interface and/or mass data storage of the media player 1200. In some implementations, the media player 1200 includes a display 1207 and/or a user input 1208 such as a keypad, touchpad and the like. In some implementations, the media player 1200 may employ a graphical user interface (GUI) that typically employs menus, drop down menus, icons and/or a point-and-click interface via the display 1207 and/or user input 1208. The media player 1200 further includes an audio output 1209 such as a speaker and/or audio output jack. The signal processing and/or control circuits 1204 and/or other circuits (not shown) of the media player 1200 may process data, perform coding and/or encryption, perform calculations, format data and/or perform any other media player function.

The media player 1200 may communicate with mass data storage 1210 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 10 and/or at least one DVD may have the configuration shown in FIG. 11. The HDD may be a mini HDD that includes one or more platters having a diameter that is smaller than approximately 1.8". The media player 1200 may be connected to memory 1214 such as RAM, ROM, low latency nonvolatile memory such as flash memory and/or other suitable electronic data storage. The media player 1200 also may support connections with a WLAN via a WLAN network interface 1216. Still other implementations in addition to those described above are contemplated.

In accordance with various embodiments of the invention, the methods described herein are intended for operation with dedicated hardware implementations including, but not limited to, semiconductors, application specific integrated circuits, programmable logic arrays, and other hardware devices constructed to implement the methods and modules described herein. Moreover, various embodiments of the invention described herein are intended for operation with as software programs running on a computer processor. Furthermore, alternative software implementations including, but not limited to, distributed processing or component/object distributed processing, parallel processing, virtual machine processing, any future enhancements, or any future protocol can also be used to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed is:

1. A compensation circuit comprising:
an input configured to receive an analog signal;
a high pass filter configured to receive the analog signal;
analog to digital conversion circuitry configured to receive an output of the high pass filter;
a finite impulse response filter configured to receive an output of the analog to digital conversion circuitry;
a baseline wander equalization filter configured to receive an output of the finite impulse response filter, and operative to compensate for baseline wander in an output of the finite impulse response filter to produce an output related to the baseline wander;
a combiner responsive to an output of the baseline wander equalization filter;
a Viterbi-like detector responsive to the combiner;
a decision feedback equalization filter responsive to an output of the Viterbi-like detector, wherein the combiner is further responsive to an output of the decision feedback equalizer; and
an error feedback circuit generating an error feedback signal based on the output of the Viterbi-like detector and a direct output of the combiner, wherein the combiner is further responsive to the error feedback signal.

2. The compensation circuit according to claim 1, wherein an output of the compensation circuit has reduced baseline wander.

3. The compensation circuit according to claim 1, wherein an output of the compensation circuit has substantially no tail from approximately time 0 to approximately time $D_{fb}$, where $D_{fb}$ is a delay of the decision feedback equalization filter.

4. The compensation circuit according to claim 1, wherein the error feedback circuit comprises a reconstruction filter responsive to the output of the Viterbi-like detector and a delay circuit responsive to the output of the combiner.

5. The compensation circuit according to claim 4, wherein the error feedback circuit comprises a second combiner responsive to an output of the reconstruction filter and an output of the delay circuit.

6. The compensation circuit according to claim 4, wherein the decision feedback equalization filter is responsive to the output of the reconstruction filter.

7. The compensation circuit according to claim 4, wherein the decision feedback equalization filter further comprises an integrator responsive to the Viterbi-like detector.

8. The compensation circuit according to claim 1, wherein the decision feedback equalization filter further comprises two poles to provide higher order signal processing.

9. The compensation circuit according to claim 8, wherein the error feedback circuit further comprises an integrator and a scaler responsive to the output of the combiner.

10. The compensation circuit according to claim 1, wherein the finite impulse response filter further comprises:
a delay line having a plurality of storage devices; and
a delay line selector configured to select at least one of the plurality of storage devices.

11. The compensation circuit according to claim 1, further comprising an analog cancellation module that includes a gain responsive to the decision feedback equalization filter and wherein the combiner is responsive to the gain.

12. The compensation circuit according to claim 1, wherein the baseline wander equalization filter operates at least in part in accordance with one of the following transfer functions:

$$H(z)F(z)=g(1-\Delta[z^{-L}+(1-\Delta)z^{-L-1}+(1-\Delta)^2z^{-L-2}+\ldots])$$

where $$g = \frac{1}{1+\pi\alpha}, \Delta = \frac{2\pi\alpha}{1+\pi\alpha},$$

$\alpha$ is the fractional corner frequency, and L is the delay; and $$H(z)F(z) = g_1 g_2 \left(1 - z^{-L} \frac{\Delta_1 + \Delta_2 - (\Delta_1 + \Delta_2 - 2\Delta_1\Delta_2)z^{-1} - \Delta_1\Delta_2 z^{-L}}{(1-(1-\Delta_1)z^{-1})(1-(1-\Delta_2)z^{-1})}\right)$$

where $$g_j = \frac{1}{1+\pi\alpha_j}, \Delta_j = \frac{2\pi\alpha_j}{1+\pi\alpha_j},$$

L is the length of the finite impulse response filter, $\alpha_1$ is a read-channel fractional pole location, and $\alpha_2$ is a preamp fractional pole location,
H(z) is a transfer function of the high pass filter,
F(z) is a transfer function of the baseline wander equalization filter, and g and $\Delta$ are scaling factors.

13. A method of compensating for errors in a signal comprising the steps of:
(a) receiving an input signal having baseline wander comprising steps of:
(i) receiving an analog input;
(ii) performing a high pass filtering operation on the analog input to produce a high-pass filtered signal;
(iii) performing analog to digital conversion of the high-pass filtered signal to produce a digital signal; and
(iv) applying a finite impulse response filter to the digital signal to produce the input signal;
(b) performing baseline wander equalization of the input signal from step (a) to produce an output related to the baseline wander in the input signal;
(c) combining an output from step (b) to form a compensated signal;
(d) detecting a sequence of the compensated signal directly from step (c) using a Viterbi-like algorithm;
(e) forming a decision equalized feedback signal in response to an output from step (d); and
(f) forming an error feedback signal in response to the compensated signal directly from step (c) and an output from step (d),
wherein step (c) further comprises the step of combining an output of step (e) and an output of step (f).

14. The method of claim 13, wherein the compensated signal has substantially no tail from approximately time 0 to approximately time $D_{fb}$, where time $D_{fb}$ is a delay of the step of filtering, at least in part, the output from step (b).

15. The method of claim 13, wherein the step of forming a decision equalized feedback further comprises second pole processing to provide higher order signal processing.

16. The method of claim 13, wherein the step of forming an error feedback signal further comprises delaying the compensated signal to form a delayed signal and reconstruction filtering the output from step (d) to form a reconstruction filtered signal.

17. The method of claim 16, wherein the step of forming an error feedback further comprises combining the delayed signal and the reconstruction filtered signal.

18. The method of claim 16, wherein the step of reconstruction filtering is responsive to the step of detecting the compensated signal with a Viterbi-like algorithm.

19. The method of claim 13, wherein the compensating method operates at least in part in accordance with at least one of the following transfer functions:

$$H(z)F(z) = g(1-\Delta[z^{-L} + (1-\Delta)z^{-L-1} + (1-\Delta)^2 z^{-L-2} + \ldots])$$

where $$g = \frac{1}{1+\pi\alpha}, \Delta = \frac{2\pi\alpha}{1+\pi\alpha},$$

α is the fractional corner frequency, and L is the delay; and $$H(z)F(z) = g_1 g_2 \left(1 - z^{-L} \frac{\Delta_1 + \Delta_2 - (\Delta_1 + \Delta_2 - 2\Delta_1\Delta_2)z^{-1} - \Delta_1\Delta_2 z^{-L}}{(1-(1-\Delta_1)z^{-1})(1-(1-\Delta_2)z^{-1})}\right)$$

where $$g_j = \frac{1}{1+\pi\alpha_j}, \Delta_j = \frac{2\pi\alpha_j}{1+\pi\alpha_j},$$

is the length of the finite impulse response filter, $\alpha_1$ is a read-channel fractional pole location, and $\alpha_2$ is a preamp fractional pole location, H(z) is a transfer function of the high pass filter, F(z) is a transfer function of the baseline wander equalization filter, and g and Δ are scaling factors.

* * * * *